United States Patent [19]
Danner

[11] Patent Number: 5,117,417
[45] Date of Patent: May 26, 1992

[54] CIRCUIT FOR CHECKING THE DEFINED TRANSMISSION BIT RATES

[75] Inventor: Gerd Danner, Munich, Fed. Rep. of Germany

[73] Assignee: Siemens Aktiengesellschaft, Munich, Fed. Rep. of Germany

[21] Appl. No.: 588,038

[22] Filed: Sep. 25, 1990

[30] Foreign Application Priority Data

Sep. 29, 1989 [DE] Fed. Rep. of Germany ....... 3932606

[51] Int. Cl.⁵ .............................. H04J 1/16; H04J 3/14
[52] U.S. Cl. ..................................... 370/13; 370/94.1; 370/84
[58] Field of Search ............... 370/13, 94.1, 60; 375/121

[56] References Cited

U.S. PATENT DOCUMENTS

| | | | |
|---|---|---|---|
| 4,218,756 | 8/1980 | Fraser | 370/94.1 |
| 4,433,411 | 2/1984 | Grefroerer et al. | 370/80 |
| 4,641,302 | 2/1987 | Miller | 370/60 |
| 4,761,800 | 8/1988 | Lese et al. | 375/121 |
| 4,907,220 | 3/1990 | Rau et al. | 370/94.1 |
| 5,007,048 | 4/1991 | Kowalk | 370/94.1 |

Primary Examiner—Benedict V. Safourek
Assistant Examiner—Dang Ton
Attorney, Agent, or Firm—Hill, Van Santen, Steadman & Simpson

[57] ABSTRACT

A circuit arrangement for transmitting message cells during virtual connections that allows the checking of the transmission bit rate in an ATM switching system which includes a plurality of counter means corresponding in number to the number of virtual connections. Upon the appearance of a message cell, the counters are individually driven based on the description of the cell header contained which indicates the virtual connection. An upward transgression of a defined transmission bit rate is indicated by an indicator signal produced by the respective counter means.

8 Claims, 2 Drawing Sheets

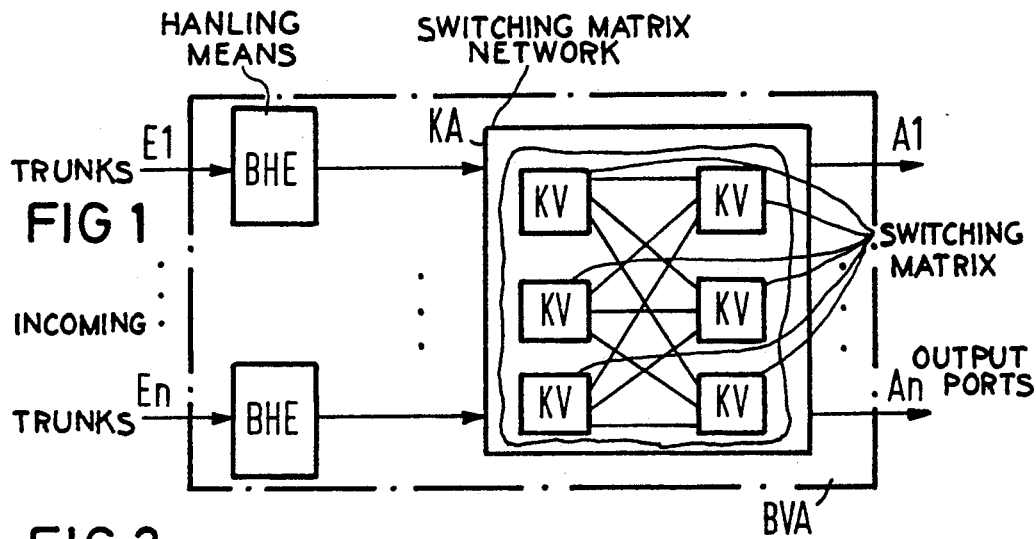
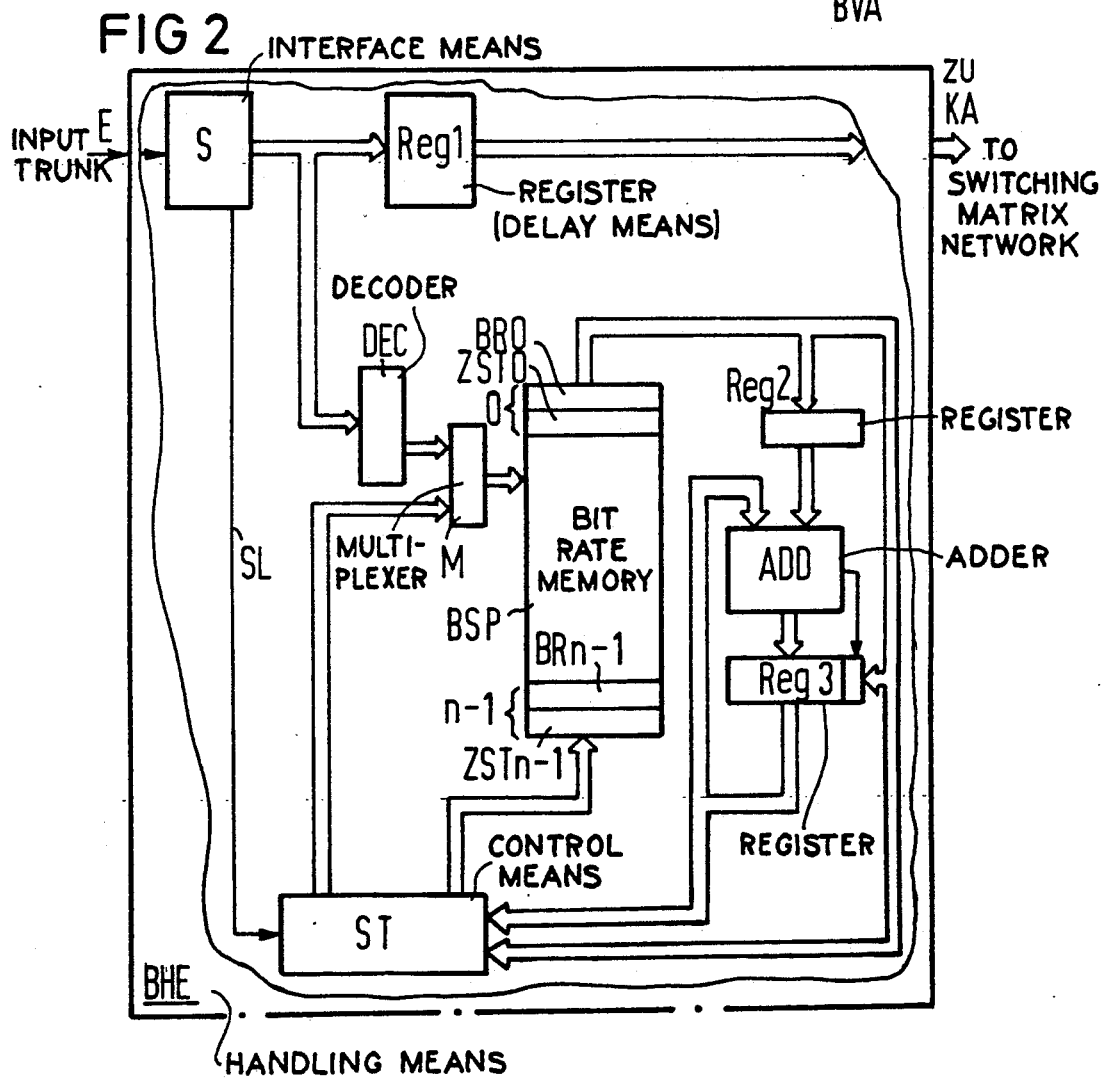

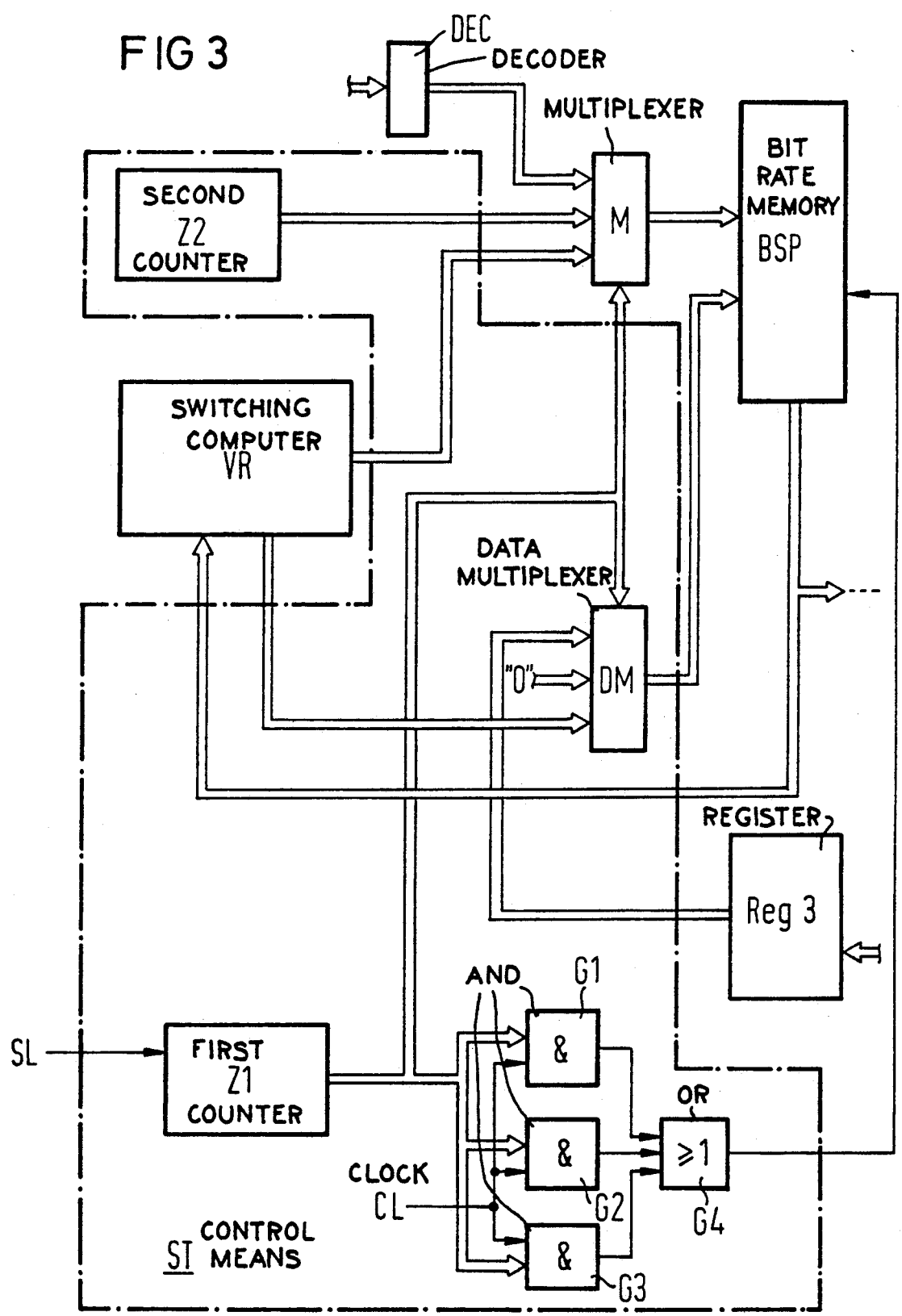

CIRCUIT FOR CHECKING THE DEFINED TRANSMISSION BIT RATES

CROSS-REFERENCE TO RELATED APPLICATIONS

This application is related to application entitled "Circuit Arrangement For Calculating The Quantity Of Message Signals Supplied To An ATM Switching System" identified in the Attorney's Record as Ser. No. 07/588,-36 Sept. 25, 1990, in which the Inventor is Gerd Danner assigned to the assignee of the present application.

BACKGROUND OF THE INVENTION

1. Field of the Invention

This invention relates in general to circuit arrangements for checking transmission rates which uses counters.

2. Description of the Prior Art

So as to avoid overload in the transmission of cells in broadband switching systems, it has been proposed in the article International Zurich Seminar on Digital Communications, March 1986, entitled "New Directions In Communications" A3.1 through A3.8, J. B. Turner to allocate a forward-backward counter in a switching node to every subscriber equipment which is connected and the forward backward counter counts the cells transmitted by the respective subscriber equipment and lowers the counter reading corresponding to the transmission rate defined by respective subscriber equipment at specific times. When the momentary counter reading exceeds a value for the respective subscriber equipment then the switching node recognizes it as an overload (leaky bucket method).

Another circuit arrangement for preventing overload in a broadband switching system is described in German published application 37 32 937. Instead of a forward-backward counter, two forward counters in this circuit arrangement are assigned in a switching node to every subscriber equipment which is connected such that a first counter counts the cells sent by the respective subscriber equipment and the other counter calculates the connection time that elapses during the existing call. The two counters are connected to a means which checks the observation of the maximum bit rate defined by the respective subscriber equipment based on the relationship between the counter readings.

SUMMARY OF THE INVENTION

It is an object of the present invention to provide a circuit arrangement which checks the transmission bit rates defined for individual virtual connections and uses counter means. It is a feature of the invention to utilize counter means which are individually driven when a message is received and which are periodically reset and to produce indicating signals from comparing the outputs of the counters.

It is an advantage of the invention in that the virtual connections by way of arbitrary offering trunks connected to an ATM switching system can be individually checked in a simple manner to determine the defined transmission bit rates by call-associated counters. Thus, for example, a call-associated check of the defined transmission bit rates for the offering trunks that are used by a number of subscriber equipments in multiplex operation is possible. Such a call-associated checking can also be implemented when subscriber equipments are simultaneously used in a plurality of virtual connections.

When message signals are transmitted in the form of message cells of fixed length during virtual connection, it is adequate for a call-associated check of the defined transmission bit rates in the present invention to modify the momentary counter reading only once by the bit rate value corresponding to the defined transmission bit rate each time a counter is driven when a message cell occurs that is to be detected. When by contrast, a transmission of message signals during virtual connections occurs with message cells having variable lengths then its response to such a drive is that the momentary counter reading is modified by the bit rate value after respectively a defined plurality of bits associated with the message cell which is being received. This plurality can therefore be fixed in accordance to the precision required for the checking of the transmission bit rates.

In the invention, simple control of the counter means respectively allocated to the offering trunks is assured and also low price circuit means are provide for the counters which are required.

Other objects, features and advantages of the invention will be readily apparent from the following description of certain preferred embodiments thereof taken in conjunction with the accompanying drawings although variations and modifications may be effected without departing from the spirit and scope of the novel concepts of the disclosure, and in which:

BRIEF DESCRIPTION OF THE DRAWINGS

FIG. 1 is a block circuit diagram of an ATM switching system wherein the invention is utilizes;

FIG. 2 illustrates one embodiment of the handling equipment which is shown in FIG. 1; and FIG. 3 is a block diagram of the control means shown in FIG. 2.

DESCRIPTION OF THE PREFERRED EMBODIMENTS

FIG. is a block diagram which illustrates an ATM switching system BVA which has connected thereto a plurality of incoming trunks E1 through En and which also has a plurality of output ports A1 through An. Transmission of message cells during virtual connections occurs on the offering trunks and the serving ports based on asynchronous transmission method ("asynchronous transfer mode"). The message cells may be cells which have a fixed length that respectively have a cell header with a virtual channel number indicating the respective virtual connection and also an information part. The transmission of the actual message signal occurs in the information part. It is to be understood that message signals may be data and text signals as well as voice or, respectively, picture signals in digital form. Also, it should be noted that the present invention can be utilized when message signals in the course of virtual connections are transmitted in cells having variable lengths.

As shown in FIG. 1, a handling means BHE is provided for each of the incoming trunks E1 through En. The structure for such handling means will be described in greater detail with reference to FIG. 2. The handling means BHE accepts the message cells which are transmitted by way of the offering trunks during the course of virtual connections and before forwarding them to a switching matrix network KA of the ATM switching system executes a call-associated check of the observation of the transmission bit rate defined for the respective virtual connection. FIG. 1 illustrates an example of a multistage structure having a plurality of switching matrices KV which are connected to each other to form the switching matrix network KA. It is to be realized, however, that arbitrary one-stage or multi-stage matrix networks can also be utilized in the invention. Since the structure and the functioning of such switching matrix networks for forwarding message cells to ports A1 through An is known to those skilled in the art additional description of such matrix networks will not be provided.

FIG. 2 illustrates the detail structure of handling means BHE and an interface means S is connected to the respective offering trunk shown as E in FIG. 2. The interface means S first recognizes the beginning of message cells transmitted in serial form and second combines bits respectively appearing in message cells into bit groups having a respectively defined [. plurality of bits as, for example, eight bits and provides the individual bit groups (octets) through a line system in parallel form. The first register Reg1 which serves as a delay means receives the output of the interface means S. A decoder DEC also receives the output of the interface means S. The register Reg1 passes all message cells which are forwarded to the switching matrix network KA. The time of delay is defined such that a check of the observation of the transmission bit rate defined for the respective virtual connection can be accomplished by the circuit arrangements hereinafter described before the message cell is forwarded to the switching matrix network KA.

The cell header of a message cell accepted into the register Reg1 is additionally supplied to the decoder DEC which by decoding the virtual channel number contained in the cell header offers address signals which are supplied to a bit rate memory BSP through first inputs of a multiplexer M. The bit rate memory BSP has a separate memory area for each of the virtual connections possible on the associated offering trunk E. The individual memory areas are thus individually selectable by recognizing the virtual channel number contained in the message cells and which is decoded by the decoder BEC. When, for example, virtual connections referenced "0" through "n−1" can proceed through the associated offering trunk E, then as indicated in FIG. 2 the memory areas referenced "0" through "n−1" are allocated. These are part of a counter means individually allocated to the respective virtual connection. The individual memory areas thus serve the purpose on the one hand of storing a momentary counter reading, which has not yet been described, of the respective counter means and also serve the purpose of storing an individually definable bit rate which will also be subsequently described. Such storing occurs under the control of a control means ST that is connected by way of line systems to first data inputs and data outputs of the bit rate memory BSP and also to second inputs of the multiplexer M. The control means ST is also connected by a control line SL to the interface means S. The momentary counter readings and bit rate values stored for the virtual connections are indicated as BR0 and BRn−1 and respectively ZST0 through ZSTn-1 according to their affiliation with the individual virtual connections.

In addition to an individual memory storage area of the bit rate memory BSP, a common adder means is available to the individual counter means in multiplex operation for all of the counter means allocated to an offering trunk. Such adder means comprises two registers which are referenced as Reg2 and Reg3 and an adder ADD. The loading inputs of these registers are in communication by way of a line system with data outputs of the bit rate memory BSP. The output of the registers Reg2 and Reg3 are connected to inputs of the adder ADD. The output of the adder ADD also provides an exit signal output which is connected to data inputs of the register Reg3 and also provides an overflow output which is connected to a separate register location of the register Reg3. The output of register Reg3 is connected to the control means ST.

The function of the handling means BHE will be described in greater detail. As has already been described, individually defined bit rate values are entered into the memory areas of the bit rate memory BSP allocated to the individual virtual connections. The definition occurs during the course of the setup of the respective virtual connection occurring on the basis of the control means ST and mainly based on the measurement of a transmission bit rate indicated by the subscriber equipment (calling subscriber equipment) which requests that the connection be made. The control means ST can allocate a normal bit rate value of, for example, the bit rate value of "1" to a maximum specific specified transmission bit rate. For a transmission bit rate which deviates from the maximum specifiable transmission bit rate, on the other hand, the assigned bit rate value may correspond to a multiple of the normal bit rate value that corresponds to the ratio of the maximally specifiable transmission bit rate to the current transmission bit rate. When thus a transmission bit rate indicated by a subscriber equipment amounts to only one-half the maximum specifiable transmission bit rate, then the bit rate value is defined as "2". After such a definition, the respective bit value is entered into that memory area of the bit rate memory BSP used for the respective virtual connection for the entire duration of the call and is entered therein during the course of a write cycle proceeding from the control means ST based on a corresponding addressing through the multiplexer M.

Also, from the control means ST, respectively, all memory areas of the bit rate memory BSP are successively selected for interrogation of the momentary counter reading respectively stored therein which is selected by addressing signals that are continuously offered through the multiplexer M during the course of control cycles that are periodically and repeatedly implemented. After the interrogation has been accomplished, the respective momentary counter reading is converted into a fixed starting counter reading. The starting counter reading is defined for example as "0".

When a message cell then appears on the offering trunk E shown in FIG. 2, then following an octet by octet conversion, this is supplied to the register Reg1 by the interface means S. The appearance of the message cell is also reported to the control means ST by an indicating signal transmitted through the control line SL. Also, the decoder DEC accepts the cell header contained in the message cell that has just appeared from the interface means S.

In response to the appearance of the indicating signal, the control means ST controls a read cycle in the bit rate memory BSP based on the measurement of the address signals supplied by the decoder DEC by way of the multiplexer M. As a result, the bit rate memory supplies the particulars stored in the memory area just being addressed at its data outputs. These involve a bit rate value defined for the respective virtual connection and involve a momentary counter reading. This momentary counter reading that for example can be assumed to be the initial counter reading "0" is thereby accepted into the register Reg3 through its loading inputs. By contrast, the bit rate value just now offered by the bit rate memory is supplied to the register Reg2. The adder ADD which is connected to these registers subsequently adds the bit rate value to the momentary counter reading, in other words, to the starting counter reading "0" in the present example. The modified momentary counter reading resulting is subsequently entered into the register Reg3 while overwriting the starting counter reading previously accepted by way of the loading inputs. A write cycle in the bit rate memory BSP subsequently occurs under the control of the control means ST. The momentary counter reading now stored in the register Reg3 is now entered in that memory area addressed by the decoder DEC through the multiplexer M while momentary overwriting the momentary counter reading previously stored therein. The evaluation of the message cell just accepted into the handling means BHE shown in FIG. 2 is thus concluded.

The events which have just been discussed and described are repeated on every appearance of a message cell on the offering trunk referenced E in FIG. 2 so that an individually calculated momentary counter reading is stored in the bit rate memory BSP for all virtual connections coming from the offering trunk E at the end of the respective control cycle implemented by the control means ST.

The adder ADD also is designed such that in the aboverecited formation of a new momentary counter reading, this indicates an upward transgression of a defined limit value with an overflow signal in the form of an overflow bit by way of the previously mentioned overflow output. This overflow bit is first accepted into the separate register location of the register Reg3 and is subsequently transferred into the bit rate memory BSP as part of the momentary counter reading provided by the adder ADD.

The above-mentioned limit value is defined based on the prescription of the above explained bit rate values and of the duration of a control cycle such that the limit value is always reached or, respectively, exceeded by a momentary counter reading when message cells in the course of the respective virtual connection are transmitted with a transmission bit rate which is higher as compared to the transmission bit rate originally specified by a subscriber equipment. Whether such an upward transgression of a specified transmission rate is present for individual virtual connections is identified during the course of the next control cycle implemented by the control means ST being identified by the aforementioned interrogation of the momentary counter readings stored in the individual memory areas of the bit rate memory BSP. In the present exemplary embodiment, a check is carried out to see whether an aforementioned overflow bit is stored at the respective momentary counter reading. Upon the presence of such an overflow bit, for example, message cells subsequently arriving during the course of the respective virtual connection are excluded from being forwarded to the switching matrix network KA shown in FIG. 1.

Only the case where message signals are transmitted in message cells having a fixed length during the course of virtual connections was considered in the above description. When by contrast, such message cells have a variable length than the above-described control cycles can also be modified such that the momentary counter reading at every appearance of a message cell is modified, for example, after, respectively, a defined plurality of octets belonging to the message cells now appearing. The plurality of octets is therefore based on the precision of which the monitoring of specified transmission bit rates should occur.

In the above described exemplary embodiment the tolerance limits for the indication of the upper transgression of specified transmission bit rates on the basis of the described definition of the individual bit rate values for the individual virtual connections and of the uniform limit value vary inversely proportional to the specified transmission bit rates. When an individual definition of such a tolerance limit is desired for the individual specifiable transmission bit rates, then the described exemplary embodiment can also be modified such that a limit value as well as the bit rate value associated thereto are individually calculated for each of the virtual connections based on the prescribed transmission bit rate indicated by a subscriber equipment, of the duration of a control cycle as well as of the respectively desired tolerance limit. Limit values and associated bit rate values are thus entered in common into the memory areas of the bit rate memory BSP allocated to the individual virtual connections. During the implementation of the read cycle, both the respective bit rate value as well as the allocated limit value are then supplied to the adder ADD for example by way of a register that is expanded in comparison to the register Reg2 illustrated in FIG. 2. With reference to these values, the adder then initially defines a new momentary counter reading in the manner described above. This is subsequently compared to the supplied limit value whereby a comparison signal corresponding to the above-mentioned overflow signal is then output from the adder when the upward transgression occurs by the momentary counter reading just calculated. The control procedures to be implemented in response then correspond to the control procedures discussed above.

In conclusion, it should be noted that the above described exemplary embodiments can also be modified such that on the one hand an overflow bit appearing at the output of the adder ADD is directly supplied to the control means ST in order to immediately prevent the forwarding of message cells which belong to the respective virtual connection. On the other hand, however, the counter means that are allocated to the individual virtual connections and are formed of the individual memory areas of the bit rate memory BSP and of the aforementioned adder means can also be realized in some other manner. Thus, for example, it is possible to respectively allocate a separate counter to the individual virtual connections, the momentary counter reading of such counter being modified in response to every drive by a bit rate value defined for the respective virtual connection.

FIG. 3 is a block circuit diagram of the control means ST shown in FIG. 2 and illustrates its connection to the various circuit elements shown in FIG. 2. It is assumed as an example for the following explanation that message cells having fixed links are transmitted and dummy cells corresponding thereto are transmitted during transmission pauses.

As shown in FIG. 3, the control means ST comprises a first counter Z1 which is connected to the control line SL. This counter arrangement Z1 is synchronized by control signals transmitted by the control line SL and runs with a counting period that corresponds to the plurality of octets appearing in the message cell or, respectively, dummy cells. Three defined counter readings are thereby offered by this counter arrangement as address signals. These address signals are output to three AND elements G1, G2 and G3 that respectively respond to one of these three address signals. The AND elements G1, G2 and G3 also receive in common clock pulses CL so that these AND elements successively offer a prescribed plurality of clock pulses within a message cell or, respectively, dummy cell that are supplied to the bit rate memory BSP as write pulses by way of a following OR element G4.

The address signals provided by the counter arrangement Z1 are also output to control inputs of the multiplexer M which serve as an address multiplexer and also to a data multiplexer DM as shown. The outputs of the multiplexers M and DM are conducted to address and data inputs of the bit rate memory BSP. Also, in addition to the decoder DEC shown in FIG. 2, a second counter arrangement Z2 as well as an address bus of a switching computer VR in the form of for example, a microprocessor that ranks higher than all handling equipment BHE are also connected to the input side of the multiplexer M by way of three line systems. The counter arrangement Z2 that runs with a counting period corresponding to the plurality of memory areas present in the bit rate memory BSP thus offers continues address signals based on the prescription of the duration of the previously discussed memory cycle that is periodically and repeatedly implemented.

Also, the register Reg3 shown in FIG. 2, and a defined starting counter reading as, for example, a binary value "0" are connected to the input of the data multiplexer DM. Also, the data bus of the switching computer VR is connected to the input of multiplexer DM.

Three separate processing time spans are defined within a message cell or, respectively, a dummy cell by the address signals output by the counter arrangement Z1. A first of the processing time spans during which the decoder DEC and the register Reg3 are connected by way of the multiplexers M and DM to the bit rate memory BSP thereby serves upon the appearance of a message cell for the readout of the allocated counter reading and of the defined bit rate value from the bit rate memory and serves for the subsequent write-in of the updated counter reading into this bit rate memory.

A second processing time span during which the counter arrangement Z2 as well as the offered starting counter reading are connected by way of the multiplexers M and DM to the bit rate memory is reserved for the interrogation of the counter readings stored in the bit rate memory that is periodically provided within the framework of the above-mentioned memory cycles and is further reserved for the subsequent conversion of the respective counter readings into the defined starting counter reading. Since the counter arrangement Z2 continuously offers address signals and interrogation and a subsequent conversion into the starting counter reading occur for all counter readings stored in the bit rate memory BSP during the course of a memory cycle extending over a plurality of message cells or respectively dummy cells. The evaluation of the individual interrogated counter readings also occurs with the switching computer VR.

During a third processing time span, the switching computer VR has its address bus and data bus in communication through the multiplexers M and DM with the bit rate memory BSP. As a result, the switching computer given the setup of a virtual connection can enter the aforementioned starting counter reading as well as the bit rate value defined for this virtual connection into the memory area of the bit rate memory that is associated therewith. When the cleardown of a virtual connection, on the other hand, occurs, the bit rate value coming into consideration therefore and the appertaining momentary counter reading in the bit rate memory can be erased.

It should be noted in conclusion, that the control means ST is merely an exemplary embodiment. The functions accomplished with this control means can also be realized by other circuit arrangements.

Although the invention has been described with respect to preferred embodiments, it is not to be so limited as changes and modifications can be made which are within the full intended scope of the invention as defined by the appended claims.

I claim as my invention:

1. A circuit arrangement for checking the transmission bit rates defined for the individual virtual connections during transmissions of message cells with the virtual connections according to an asynchronous transmission method in which an ATM switching system (BVA) accepts the message cells from incoming trunks (E1, ... En) and uses counter means associated with the incoming trunks, comprising for each of the incoming trunks a plurality of counter means (BSP, Reg2, Reg3, ADD) which correspond in number to the plurality of virtual connections for the respective incoming trunk (E1, ..., En), said counter means individually driven upon the reception of message cells for the transmission duration of the respective message cell and based on the definition of a cell header respectively contained therein which identifies a respective virtual connection, said counter means periodically repeatedly reset to a starting counter reading at defined time intervals, and in response to every drive of the respective counter means; the momentary counter reading is modified at least once during the reception of the respective message cell by an available bit rate which corresponds to the transmission bit rate defined for the respective virtual connection; an upward transgression signal from said counter means indicating the upward transgression of the transmission bit rate defined for the respective virtual connection is produced for a given upward transgression by a momentary counter reading of a maximum counter reading which is defined by the available bit rate value and the duration of time intervals; and said respective counter means can be interrogated at the end of the respective time interval to obtain an upward transgression signal or, respectively, an a signal is directly produced by the respective counter means.

2. A circuit arrangement according to claim 1, wherein in response to the drive of one of said counter means (BSP, Reg2, Reg3, ADD) which occurs upon the appearance of a message cell, the momentary counter reading thereof is modified after a respectively defined plurality of bits of the message cell which are just appearing by the bit rate available to the respective counter means.

3. A circuit arrangement according to claim 1, wherein a normal bit rate value ("1") is assigned to a maximally definable transmission bit rate; and a uniform, maximum counter reading is defined for all counter means (BSP, Reg2, Reg3, ADD) based on said normal bit rate value and the defined duration of the time intervals; and the assigned bit rate value for a current transmission bit rate which deviates from the maximally definable transmission bit rate is a multiple of the normal bit rate value and which multiple corresponds to the ratio of the maximally definable transmission bit rate to the current transmission bit rate.

4. A circuit arrangement according to claim 1, wherein the bit rate value and the maximum counter reading for each of said counter means are separately defined based on the definition of the transmission bit rate for the respective virtual connection and the duration of the time intervals.

5. A circuit arrangement according to claim 1, wherein said counter means assigned to an offering trunk are respectively composed of an individual memory area of a writeread memory (BSP) which serves the purpose of storing the bit rate value assigned to the respective virtual connection and the respective momentary counter reading and of an adder means (Reg2, Reg3, ADD) connected to the write-read memory which are shared in common by all counter means; a respectively defined starting counter reading can be periodically repeatedly entered as a momentary counter reading into the memory areas during a memory cycle which is activated by a control means (ST) which is connected to all memory areas; and upon the receipt of message cells, the individual memory areas can be individually used in a control cycle for the transmission duration of the respective message cell based on the description in the cell header respectively contained in said message cell, and during the course of said control cycle, first, a momentary counter reading just stored in the respective memory area and the bit rate value belonging thereto are supplied to said adder means (Reg2, Reg3, ADD) for a modification of the momentary counter reading and, subsequently, the momentary counter reading from the adder means is entered into the respective memory area while overwriting the momentary counter reading hitherto stored therein; and said adder means upon the given upward transgression of the defined, maximum counter reading by the momentary counter reading that has just been offered separately produces an indication signal which indicates the upward transgression of the transmission bit rate defined for the respective virtual connection.

6. A circuit arrangement according to claim 2, wherein a normal bit rate value ("1") is assigned to a maximally definable transmission bit rate; and a uniform, maximum counter reading is defined for all counter means (BSP, Reg2, Reg3, ADD) based on said normal bit rate value and the defined duration of the time intervals; and the assigned bit rate value for a current transmission bit rate which deviates from the maximally definable transmission bit rate is a multiple of the normal bit rate value and which multiple corresponds to the ratio of the maximally definable transmission bit rate to the current transmission bit rate.

7. A circuit arrangement according to claim 2, wherein the bit rate value and the maximum counter reading for each of said counter means are separately defined based on the definition of the transmission bit rate for the respective virtual connection and the duration of the time intervals.

8. A circuit arrangement according to claim 2, wherein said counter means assigned to an offering trunk are respectively composed of an individual memory area of a writeread memory (BSP) which serves the purpose of storing the bit rate value assigned to the respective virtual connection and the respective momentary counter reading and of an adder means (Reg2, Reg3, ADD) connected to the write-read memory which are shared in common by all counter means; a respectively defined starting counter reading can be periodically repeatedly entered as a momentary counter reading into the memory areas during a memory cycle which is activated by a control means (ST) which is connected to all memory areas; and upon the receipt of message cells, the individual memory areas can be individually used in a control cycle for the transmission duration of the respective message cell based on the description in the cell header respectively contained in said message cell, and during the course of said control cycle, first, a momentary counter reading just stored in the respective memory area and the bit rate value belonging thereto are supplied to said adder means (Reg2, Reg3, ADD) for a modification of the momentary counter reading and, subsequently, the momentary counter reading from the adder means is entered into the respective memory area while overwriting the momentary counter reading hitherto stored therein; and said adder means upon the given upward transgression of the defined, maximum counter reading by the momentary counter reading that has just been offered separately produces an indication signal which indicates the upward transgression of the transmission bit rate defined for the respective virtual connection.

* * * * *